US 6,650,722 B1

(12) United States Patent
Steiner et al.

(10) Patent No.: US 6,650,722 B1
(45) Date of Patent: Nov. 18, 2003

(54) HYDRAULIC CONTROL UNIT TRANSPONDER CARD

(75) Inventors: William Michael Steiner, San Jose, CA (US); Steven Dale Sawyer, San Jose, CA (US); Craig Miles Smith, San Jose, CA (US); Leonid Boris Sheikman, San Jose, CA (US); Vernon Evans Martin, Jackson, WY (US); Craig Ernest Leighty, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/026,163

(22) Filed: Dec. 21, 2001

(51) Int. Cl.[7] .................................................. G21C 7/36
(52) U.S. Cl. ......................... 376/217; 376/230; 376/259
(58) Field of Search ............................ 376/217, 230, 376/259

(56) References Cited

U.S. PATENT DOCUMENTS

| 3,706,921 A | | 12/1972 | Rosen |
| 3,793,141 A | * | 2/1974 | Ball ............................. 376/230 |
| 4,263,580 A | * | 4/1981 | Sato et al. .................... 340/3.9 |
| 4,282,061 A | | 8/1981 | Sakurai et al. |
| 4,640,812 A | | 2/1987 | Sawyer et al. |
| 4,690,794 A | * | 9/1987 | Onodera ...................... 376/230 |
| 5,030,410 A | | 7/1991 | Perry et al. |
| 5,128,093 A | * | 7/1992 | Ose ............................. 376/219 |
| 5,586,156 A | | 12/1996 | Gaubatz |
| 2002/0122520 A1 | * | 9/2002 | Ishii et al. ................... 376/230 |

FOREIGN PATENT DOCUMENTS

JP            2181695            7/1990

OTHER PUBLICATIONS

Reigel et al., "Multiplexed Rod Drive Control System For A General Electric BWR", Conference Paper C 73 203–7, IEEE Power Engineering Society Winter Meeting, New York, New York, Jan. 28–Feb. 2, 1973.*
European Search Report, EP02 25 8735, 3 pgs., May 16, 2003.

* cited by examiner

Primary Examiner—Michael J. Carone
Assistant Examiner—R. Palabrica
(74) Attorney, Agent, or Firm—Armstrong Teasdale LLP

(57) ABSTRACT

A transponder card for a nuclear reactor control rod drive control system is provided. The control system includes a control processor and a plurality of electrical devices operationally coupled to the control processor. The transponder card is configured to receive commands from the control processor, energize an appropriate electrical device when commanded, detect a failure in control circuitry of the transponder card, send a failure alarm, and remove power from an electrical device during a control circuitry failure event when there is no command to energize the electrical device.

17 Claims, 4 Drawing Sheets

HYDRAULIC CONTROL UNIT TRANSPONDER CARD

BACKGROUND OF THE INVENTION

This invention relates generally to nuclear reactors, and more particularly to control rod drive unit hydraulic control unit transponder cards.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

The reactor core is formed from a plurality of fuel elements. The fuel elements are grouped together at fixed distances from each other in a fuel bundle. A sufficient number of these fuel bundles are combined to form a reactor core capable of a self-sustaining chain reaction. Neutron-absorbing control rods are inserted into the core to control the reactivity of the core. The reactivity of the core can be adjusted by incremental insertions and withdrawals of the control rod.

Each control rod is housed within a vertical guide tube that ensures the vertical orientation and motion of the control rod. The control rod is moved using a control rod drive mechanism that is at least partially housed in a stub tube that also serves to support the base of the guide tube. A rod drive control system controls a hydraulic control unit (HCU) that causes the control rod drive mechanism to move the control rod, either inserting or withdrawing the rod from the fuel bundle. The HCU includes transponder cards that control the solenoids in the HCU.

Because the control rods are the primary means for regulating reactor output, it is essential that the control rod drives remain fully functional. Any failure of one of the transponder cards requires immediate attention of plant personnel to replace the defective electronics so that the HCU can become fully operational. In some cases, failure modes permit the transponder to energize the control rod movement circuitry and cause inadvertent incremental control rod insertion for a period of time before the control system detects the failure and stops the rod movement.

BRIEF DESCRIPTION OF THE INVENTION

In one aspect, a transponder card for a nuclear reactor control rod drive control system is provided. The control system includes a control processor and a plurality of electrical devices operationally coupled to the control processor. The transponder card is configured to receive commands from the control processor, energize an appropriate electrical device when commanded, detect a failure in control circuitry of the transponder card, send a failure alarm, and remove power from an electrical device during a control circuitry failure event when there is no command to energize the electrical device.

In another aspect, a nuclear reactor control rod drive control system is provided. The nuclear reactor includes a plurality of control rods, and the control system includes a control processor, a control rod drive configured to be connected to a control rod, and a hydraulic control unit connected to the control rod drive. The hydraulic control unit includes at least one solenoid, at least one directional control valves, and at least one transponder card. Each solenoid is connected to one of the directional control valves, and each transponder card is operationally coupled to the control processor. Each transponder card is configured to receive commands from the control processor, energize an appropriate solenoid when commanded by the control processor, detect a failure in control circuitry of the transponder card, send a failure alarm to the control processor, and remove power from a solenoid during a control circuitry failure event when there is no command to energize said solenoid.

In another aspect, a method of controlling the movement of a control rod in a nuclear reactor core is provided. The method includes sending a command from a rod control processor to a transponder card in an hydraulic control unit, and energizing an appropriate directional control valve solenoid with an output from the transponder card. The hydraulic control unit includes a plurality of directional control valves and a plurality of solenoids. Each solenoid is connected to a directional control valve. The transponder card is configured to receive commands from the control processor, energize the appropriate solenoid when commanded by the control processor, detect a failure in control circuitry of the transponder card, send a failure alarm to the control processor, and remove power from a solenoid during a control circuitry failure event when there is no command to energize the solenoid.

DETAILED DESCRIPTION OF THE INVENTION

A transponder card for a nuclear reactor control rod drive control system is described below in more detail. The transponder card permits continued system operation in the event of a failure of transponder card circuitry that controls the movement of the control rods. The transponder card is configured to detect failures of its rod control circuitry and prevent inadvertent incremental rod insertion without depending on the Rod Control system to remove power from the transponder card. Further, the transponder card can announce to the Rod Control system via a bit on a serial data word that the transponder card has detected a defect in itself.

Figure 1:
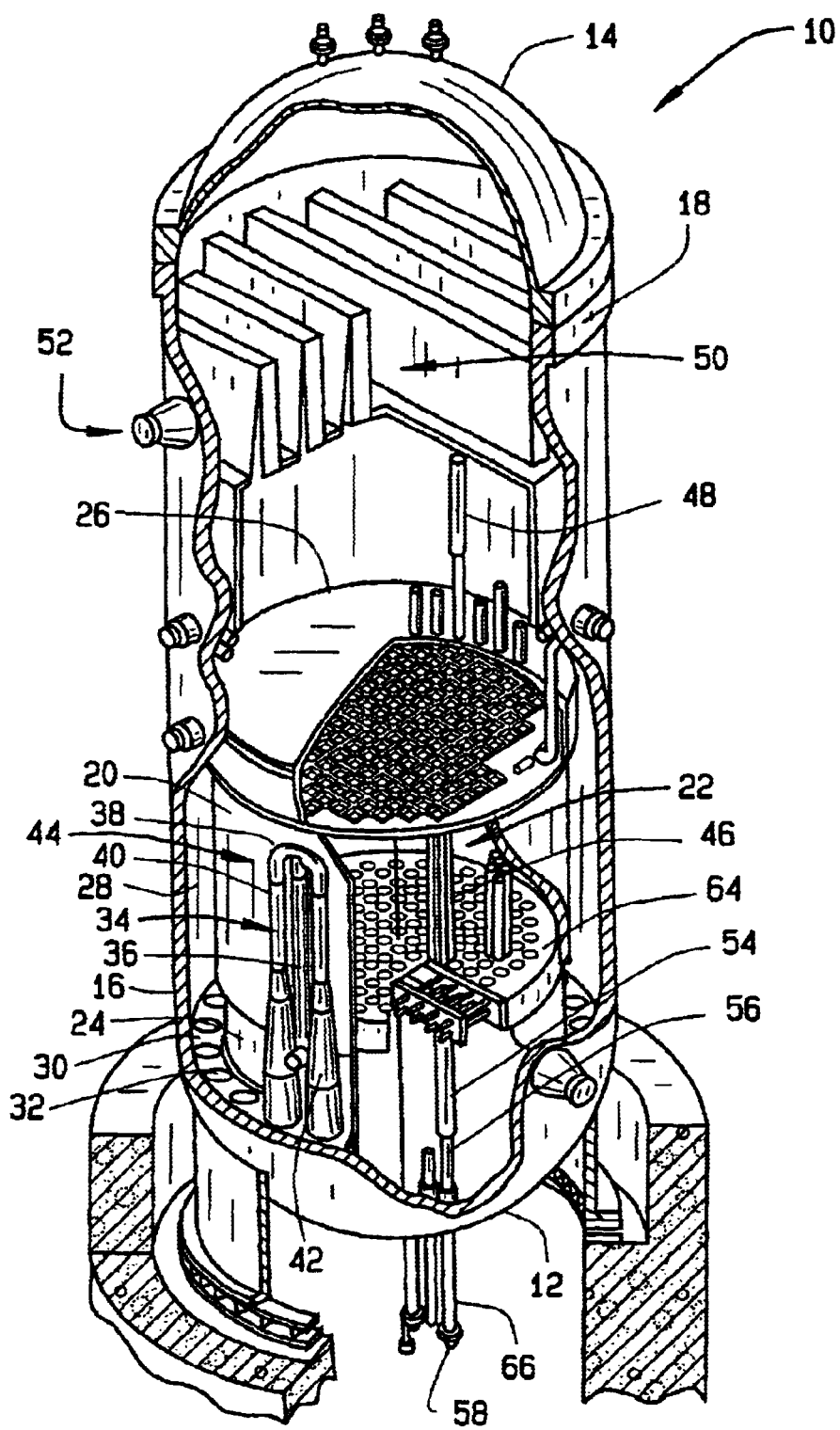
FIG. 1 is a sectional schematic view, with parts cut away, of a boiling water nuclear reactor pressure vessel.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes an opposed removable shroud head 26. An annulus 28 is formed between shroud 20 and side wall 16.

A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separates steam from water, which is recirculated. Steam dryers 50 remove residual water from the steam. The steam exits RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted into fuel bundle 46, it absorbs neutrons that would otherwise be available to promote the chain reaction which generates heat in core 22.

Control rod 54 couples with a control rod drive (CRD) 58 which moves control rod 54 relative to a core plate 64 and fuel bundles 46. CRD 58 extends through bottom head 12 and is enclosed in a control rod drive housing 66. A control rod guide tube 56 extends vertically from control rod drive mechanism housing 66 to core plate 64. Control rod guide tubes 56 restrict non-vertical motion of control rods 54 during control rod 54 insertion and withdrawal.

Figure 2:
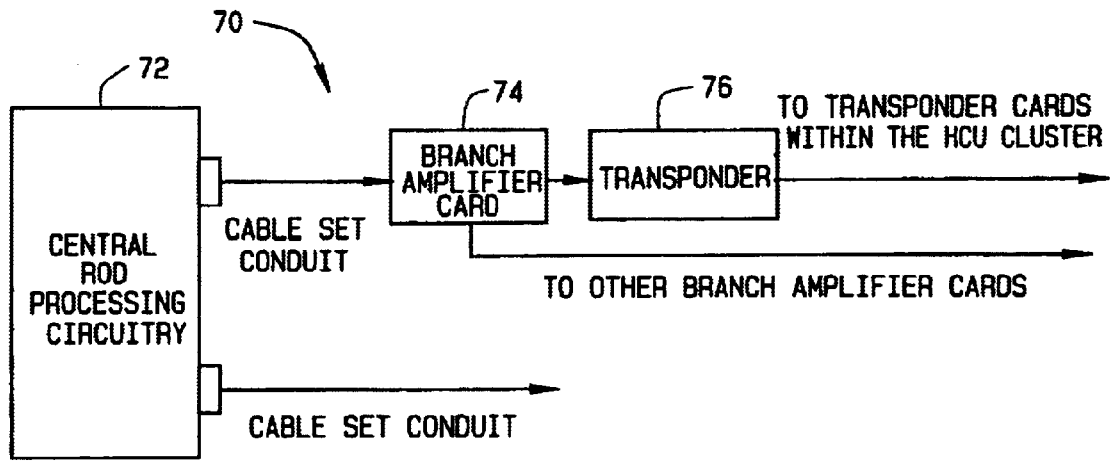
FIG. 2 is a simplified block diagram of the control rod drive control system in accordance with an embodiment of the present invention.

FIG. 2 is a simplified block diagram of a control rod drive control system (RDCS) 70 in accordance with an embodiment of the present invention. RDCS 70 includes central rod processing circuitry or control processor 72 that is operationally coupled to a branch amplifier card 74 that is operationally coupled to a transponder card 76. Particularly, in one embodiment, branch amplifier card 74 and transponder card 76 are operationally coupled to control processor 72 via serial digital electronic communication. Branch amplifier card 74 and transponder card 76 are part of a hydraulic control unit (HCU) 78. HCU 78 includes a plurality of transponder cards 76 arranged in clusters of several transponder cards 76 coupled to a branch amplifier card 74. Branch amplifier card 74 serves, in part, to distribute command (CMD) words it receives from central rod processing circuitry 72 to transponder cards 76 within its cluster and to the next downstream branch amplifier card 74. In a reverse manner, acknowledge (ACK) words are routed within a cluster to the cluster's branch amplifier card 74. Each branch amplifier card 74, in turn, routes the ACK work to a branch amplifier card 74 further upstream and back to control processor 72.

Figure 3:
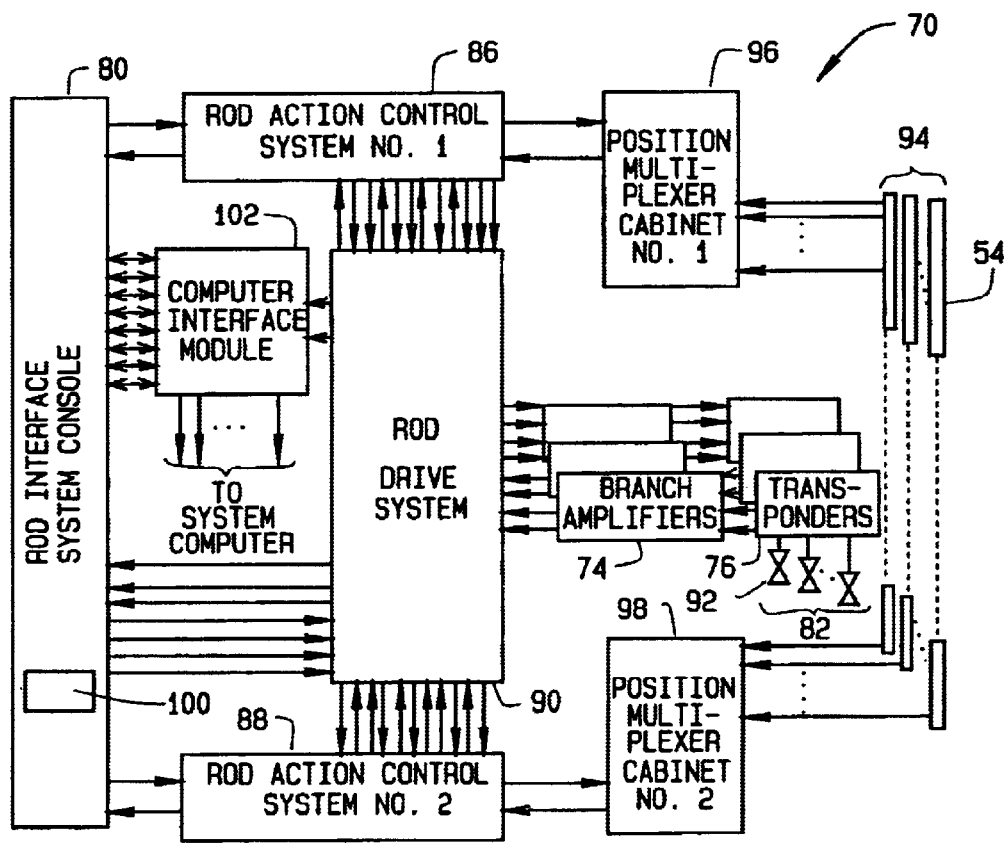
FIG. 3 is a signal flow diagram of the control rod drive system.

With reference to FIG. 3, in an exemplary embodiment, RDCS 70 enables a plant operator to select and maneuver control rods and display rod positions at all times. It includes a set of components, both in the control room and inside the containment, that generate, check and distribute digital electronic messages ("words") sent from an operator's console 80 to hydraulic control units 82 and from rod position probes 84 back to console 80.

A general overview of the operation of the RDCS 70 is as follows. The plant operator selects the rod or rods to move at rod interface system (RIS) bench-board console 80. Request words are sent to two redundant rod action control system (RACS) cabinets 86 and 88. Each RACS cabinet 86 and 88 independently evaluates the operator's request to insure that the desired rod motion will result in a permissible control rod pattern. Validated requests are transmitted to a rod drive system (RDS) cabinet 90. RDS cabinet 90 compares the validated rod movement commands from the two RACS cabinets 86 and 88 and, if they agree, sends CMD words to a set of hydraulic control rod drive units 78 via clusters of branch junction amplifier cards 74 and transponder cards 76. A plurality of position probes 94 underneath pressure vessel 10 measure control rod 54 positions and send probe word messages to two redundant rod position multiplexer (MUX) cabinets 96 and 98. RACS cabinets 86 and 88 independently compare measured rod positions against allowed rod pattern configurations. RACS cabinets 86 and 88 send position information to RDS cabinet 90 for further transmittal to an operator's display 100 on RIS console 80. RDS cabinet 90 sends position data to a plant process computer (not shown) by means of Process words sent via a computer interface module 102.

HCU transponder card 76 is configured to receive and buffer CMD words on to downstream transponder cards 76 in the same cluster. Transponder card 76 is also configured to compare a command address embedded in the CMD word with the transponder card's own unique identification card address. If the addresses compare (agree), then the command bits of the CMD word are decoded and the appropriate directional control valve solenoid 92 is energized. Transponder card 76 is also configured to transmit its own ACK word to the next upstream transponder card 76. If the addresses do not compare, then transponder card 76 passes any signal on the ACK input to the ACK output. Each transponder card 76 also is configured to generate valve activity bits based on its monitoring of HCU directional control valve solenoid circuits for continuity and energization. Further, each transponder card is configured to generate an ACK word composed of an identification card address, directional valve activity bits, HCU status bits, and transponder trouble bits.

Each transponder 76 is configured to receive as input CMD words from the upstream transponder card or a branch amplifier card 74, ACK words from the downstream transponder card, and HCU 78 status. HCU 76 status includes:

Both scram valves not fully closed

Scram accumulator trouble ($N_2$ gas pressure low or water on the gas side of the accumulator piston)

Both scram test switches not in "Normal"

AC voltage from the downstream transponder card

Each transponder card 76 is configured to output CMD words to the downstream transponder and ACK words to the upstream transponder or branch amplifier card. Further, each transponder card 76 is configured to output switched AC voltage to the directional control valve solenoids and AC voltage to the downstream voltage. Any suitable AC voltage can be used, for example, 120 volts AC at 60 Hz or 12 volts AC at 50 Hz. Of course, AC voltages higher or lower than 120 volts AC can be used.

Figure 4:
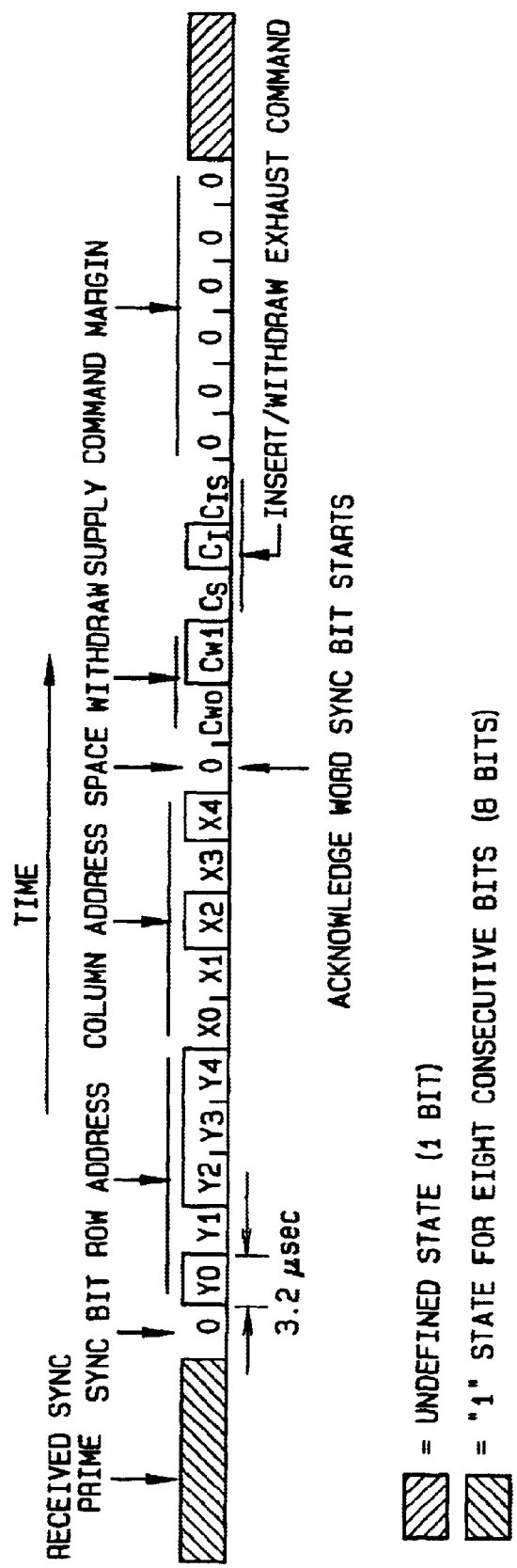
FIG. 4 is a representation of a command word.

The CMD word is composed of a 32-bit serial word transmitted as a serial data stream. This data stream can be divided into 8 defined sections. The data bit transmission rate is 312.5 kHz (3.2 $\mu$s), which results in a 102.4 $\mu$s of total word length. FIG. 4 shows an exemplary embodiment of a CMD word and Table I provides the description of the CMD word shown in FIG. 4.

TABLE I

| | NUMBER OF BITS | BIT DESIGNATION | STATE |
|---|---|---|---|
| Received Sync | 8 | Prime | Eight "1" State |
| CMD Sync Bit | 1 | Sync | One "0" State |
| Row Address | 5 | $Y_0\ Y_1\ Y_2\ Y_3\ Y_4$ | * |
| Column Address | 5 | $X_0\ X_1\ X_2\ X_3\ X_4$ | * |
| Space | 1 | Spacer | One "0" State |
| Withdraw Supply | 2 | $C_{W0}\ C_{W1}$ | See Table II |
| Insert/Withdraw Supply and Exhaust | 3 | $C_S\ C_I\ C_{IS}$ | See Table II |
| Margin | 6 | | Six "0" States |
| Undefined | 1 | | |
| Total | 32 | | |

*Each transponder has its own ID number corresponding to the plant arrangement of HCUs. Each ID number is composed by row and column address corresponding to the X and Y coordinates of the plant arrangement.

The Received Synchronization prime is sent prior to CMD Synchronization bit. The state of prime bits is "1". The CMD Synchronization bit is set at "0" state. When the transponder card receives this bit, it indicates that the row address will be received on the next bit. Each Transponder has its own ID number corresponding to the plant arrangement of HCUs. Each ID number is composed by row and column address corresponding to the X and Y coordinates of the plant arrangement. The Space bit is sent to separate the ID number from command bits. The state of space bit is set at "0". When the ID number matches with a particular transponder, the ACK word is generated at this point. The Withdraw Supply and Insert/Withdraw Exhaust bits of the CMD word are dynamically encoded. When the Transponder receives command bits for HCU directional control valve activation, the succeeding word's command bits are required to be encoded with the complement of previous word's command bits. If the succeeding word's command bits are not encoded as complement of previous command bits, the activated control valve will be timed out (de-energized). Table II shows the logical values of the command bit that cause the activation to occur. The Margin set of bits is set at "0" state, and is sent prior to the received synchronization bits. The purpose of the margin bits is to permit the transponder card to complete the transmission of the ACK word.

TABLE II

| CONTROL ROD ACTION | VALVE ACTION | $C_{IS}$ | $C_I$ | $C_S$ | $C_{W1}$ | $C_{W0}$ |
|---|---|---|---|---|---|---|
| None | None | 1 | 1 | 1 | 1 | 1 |
| | | 1 | 1 | 1 | 1 | 1 |
| Insert | Activate Insert Supply & Exhaust | 1 | 1 | 0 | X | X |
| | | 0 | 0 | 1 | X | X |
| Withdraw | Activate Withdraw Supply | X | X | X | 1 | 0 |
| | | X | X | X | 0 | 1 |
| Withdraw & Settle | Activate Withdraw Exhaust | 0 | 1 | 0 | X | X |
| | | 1 | 0 | 1 | X | X |

Figure 5:
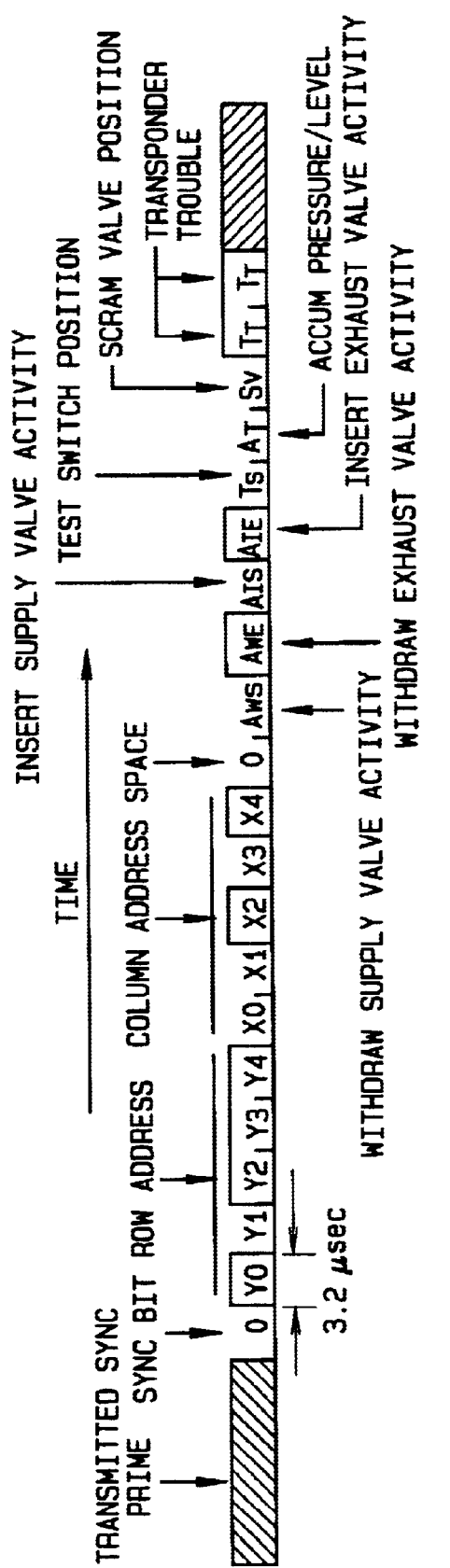
FIG. 5 is a representation of an acknowledge word.

The ACK word is also composed of a 32-bit serial data stream. This data stream can be divided into eight sections. The data transmission rate is 312.5 kHz (3.2 µs), which results in 102.4 µs of total word length. FIG. 5 shows an exemplary embodiment of an ACK word and Table III provides the description of the ACK word shown in FIG. 5.

TABLE III

| | NUMBER OF BITS | BIT DESIGNATION | STATE |
|---|---|---|---|
| Transmitted Sync | 10 | Prime | Ten "1" State |
| ACK Sync Bit | 1 | Sync | One "0" State |
| Row Address | 5 | $Y_0\ Y_1\ Y_2\ Y_3\ Y_4$ | * |
| Column Address | 5 | $X_0\ X_1\ X_2\ X_3\ X_4$ | * |
| Space | 1 | Spacer | One "0" State |
| Direction Control Valve Status | | | |
| Withdraw supply valve activity | 1 | $A_{WS}$ | "0" for Valve Energized |
| Withdraw exhaust valve activity | 1 | $A_{WE}$ | "0" for Valve Energized |
| Insert supply activity | 1 | $A_{IS}$ | "0" for Valve Energized |
| Insert exhaust valve activity | 1 | $A_{IE}$ | "0" for Valve Energized |
| HCU Status | | | |
| Test switch position | 1 | $T_S$ | "1" for Both Closed |
| Accumulator pressure/level | 1 | $A_T$ | "1" for High Pressure and No Leak |
| Scram valve position | 1 | $S_V$ | "0" for Both Open |
| Transponder Trouble | 2 | $T_1$ | "1" when Transponder detects problem |
| Beginning of next Prime "Pre-Prime" | 1 | | |
| Total | 32 | | |

*Each transponder has its own ID number corresponding to the plant arrangement of HCUs. Each ID number is composed by row and column address corresponding to the X and Y coordinates of the plant arrangement.

In conjunction with the Synchronization bit, the Transmitted Synchronization Prime Bits serves to provide a means for the receiving circuitry to synchronize its reception to the word being received in order to interpret the bit meanings correctly. Ten consecutive "1" states are required to synchronize the receiving circuitry. The ACK Synchronization bit is set at "0". This bit in conjunction with the Transmitted Synchronization Prime is used to synchronize the receiving circuitry to the word being received. Each Transponder has its own ID number corresponding to the plant arrangement of HCUs. Each ID number is composed by row and column address corresponding to the X and Y coordinates of the plant arrangement. The Space bit is sent to separate the ID number from the Directional Valve Status Bits. The state of space bit is set at "0". The Direction Valve Status Bits contains four bits, and provides the activation status of directional valves. The status of each valve is given by the following two equations.

SET ("1" State)=(Input power is above AC peak) AND (solenoid valve circuitry has continuity) AND (solenoid valve is de-energized)

RESET ("0" State)=(Input power is near 0 volt) OR (solenoid valve circuitry is opened) OR (solenoid valve is energized)

The HCU status contains three bits, and provides the test switch, HCU accumulator pressure and scram valve position. The Transponder removes power to the solenoid and sets the Transponder Trouble flag to "1" if the Transponder detects energization of a directional control solenoid without an appropriate command.

HCU transponder card 76 includes a self-testing function that uses solid-state relays in each of the valve control circuits to interrupt the current through the directional valve solenoids if the self-testing circuitry detects a disagreement between the valve monitoring circuitry and the command word received by the card. In other words, if the valve is energized with no command, the self-test circuitry removes power to the valve solenoid after a short time delay by turning off the solid-state relay that is in series with the valve current path. Once the HCU Transponder self-test circuitry detects an agreement between the CMD word and the valve activity, the solid-state relay will again be energized and allow the transponder to operate properly. An Analyzer Card in central rod processing circuitry 72 interrogates the HCU Transponder at intervals as part of a self-testing program. Failure of a Transponder to encode a proper ACK word is detected immediately in the control room and indicated through an annunciation window alarm. The self-test feature of the HCU Transponder 76 detects and prevents operation of a control rod directional control solenoid without an appropriate command from the Rod Drive Control System. A secondary self-test feature of the HCU Transponder is to detect most single component failure modes that would prevent activation of the back-up solenoid de-energization circuitry.

HCU Transponder 76 removes power to the solenoid and sets the "Transponder Trouble" flag (serial word bit) to a logic "one" if HCU transponder 76 detects energization of a directional control solenoid without an appropriate command. The "Transponder Trouble" flag occupies the two-bit locations reserved for the Pn and Pp bits added to the Acknowledge word by branch amplifier card 74.

If a momentary short turns on the valve control solenoid but is subsequently removed, transponder 76 will remove power to the valve circuit by de-energizing the solid state relay. Every two minutes, the Analyzer Card will retest the failed Transponder Card. Retesting of the valve control solenoid by the Analyzer Card will provide an agreement between the disconnected state of the valve control monitoring circuitry (appears to the valve monitoring circuitry as energized) and the Analyzer "test" Command word. The self-test circuitry in transponder 76 will again energize the solid-state relay and permit the transponder control circuitry to energize the directional valve solenoid upon command. With control returned to the valve energization circuitry, transponder 76 again operates in a normal manner.

While the invention has been described in terms of various specific embodiments, those skilled in the art will recognize that the invention can be practiced with modification within the spirit and scope of the claims.

What is claimed is:

1. A transponder card for a nuclear reactor control rod drive control system, the control system comprising a control processor and a plurality of electrical devices operationally coupled to the control processor, said transponder card configured to:
   receive commands from the control processor;
   energize an appropriate electrical device when commanded;
   detect a failure in control circuitry of said transponder card;
   send a failure alarm; and
   remove power from an electrical device during a control circuitry failure event when there is no command to energize the electrical device.

2. A transponder card in accordance with claim 1 wherein said transponder card is further configured to energize the appropriate electrical device during a control circuitry failure event when commanded.

3. A transponder card in accordance with claim 1 wherein said transponder card is further configured to:
   detect if an electrical device is energized when said transponder card has been commanded to energize the solenoid; and
   detect if an electrical device is de-energized when said transponder card has been commanded to de-energize the electrical device.

4. A transponder card in accordance with claim 1 further configured to:
   receive a command word from the control processor; and
   buffer the command word on to another transponder card located downstream from said transponder card.

5. A transponder card in accordance with claim 4 wherein each said transponder card comprises a unique identification address and each said transponder card is configured to:
   compare a command address embedded in the command word with said identification address of said transponder card;
   decode command bits of the command word to energize the appropriate electrical device when the command address compares with said transponder card identification address; and
   transmit an acknowledge word to another transponder card located upstream from the transponder card.

6. A transponder card in accordance with claim 1 further configured to generate an acknowledge word comprising:
   a transponder identification address;
   electrical device activity bits;
   electrical device status bits; and
   transponder trouble bits.

7. A transponder card in accordance with claim 5 further configured to receive the following inputs:
   command words from an upstream transponder card or the control processor;
   acknowledge words from a downstream transponder card; and
   electrical device status.

8. A transponder card in accordance with claim 1 further configured to output the following:
   command words to a downstream transponder card;
   acknowledge word to an upstream transponder card or the control processor;
   switched AC voltage to the electrical devices; and
   AC voltage to a downstream transponder.

9. A nuclear reactor control rod drive control system, the nuclear reactor comprising a plurality of control rods, said control system comprising:
   a control processor;
   a control rod drive configured to be connected to a control rod; and
   an hydraulic control unit connected to said control rod drive, said hydraulic control unit comprising at least one solenoid, at least one directional control valves, and at least one transponder card, each said solenoid connected to one of said at least one directional control valve, each transponder card operationally coupled to said control processor and configured to:
   receive commands from said control processor;
   energize an appropriate solenoid when commanded by said control processor;
   detect a failure in control circuitry of said transponder card;

send failure alarm to said control processor; and remove power from a solenoid during a control circuitry failure event when there is no command to energize said solenoid.

10. A control system in accordance with claim 1 wherein said transponder card is further configured to energize the appropriate electrical device during a control circuitry failure event when commanded.

11. A control system in accordance with claim 9 wherein said transponder card is further configured to:

detect if a solenoid is energized when said transponder card has been commanded to energize said solenoid; and detect if a solenoid is de-energized when said transponder card has been commanded to de-energize said solenoid.

12. A control system in accordance with claim 9 further comprising at least one cluster of transponder cards, said transponder cards configured to:

receive a command word from said control processor; and buffer the command word on to downstream transponder cards in the same cluster.

13. A control system in accordance with claim 11 wherein each said transponder card comprises a unique identification address and each said transponder card is configured to:

compare a command address embedded in the command word with said identification address of said transponder card;

decode command bits of the command word to energize the appropriate directional control valve solenoid when the command address compares with said transponder card identification address; and transmit an acknowledge word to the next upstream transponder card.

14. A control system in accordance with claim 9 wherein said transponder card is configured to generate an acknowledge word comprising:

a transponder identification address;

directional valve activity bits;

hydraulic control unit status bits; and transponder trouble bits.

15. A control system in accordance with claim 9 wherein said transponder card is configured to receive the following inputs:

command words from an upstream transponder card or said control processor;

acknowledge words from a downstream transponder card; and hydraulic control unit status.

16. A control system in accordance with claim 9 wherein said transponder card is configured to output the following:

command words to a downstream transponder card;

acknowledge word to an upstream transponder card or said control processor;

switched AC voltage to said directional control valve solenoids; and

AC voltage to a downstream transponder.

17. A control system in accordance with claim 9 wherein each said transponder card is operationally coupled via serial digital electronic communication to said control processor.

* * * * *